United States Patent [19]

Tasch et al.

[11] Patent Number: 5,502,363
[45] Date of Patent: Mar. 26, 1996

[54] APPARATUS FOR CONTROLLING ANGULAR POSITIONING AND STIFFNESS MODULATIONS OF JOINT OF ROBOTIC MANIPULATOR

[75] Inventors: Uri Tasch, Pikesville; Arie Kalkstein, Baltimore, both of Md.

[73] Assignee: University of Maryland-Baltimore County, Baltimore, Md.

[21] Appl. No.: 177,123

[22] Filed: Jan. 4, 1994

[51] Int. Cl.⁶ .................................................. B25J 17/00
[52] U.S. Cl. .................................. 318/568.11; 318/568.1; 901/14; 901/46
[58] Field of Search .................................. 318/560–646; 901/21, 23, 34, 46; 74/479 R, 89.2, 89.22, 109, 422; 414/744 R, 730–732

[56] References Cited

U.S. PATENT DOCUMENTS

| | | | |
|---|---|---|---|
| 3,824,674 | 7/1974 | Inoyama et al. | 29/407 |
| 4,392,776 | 7/1983 | Shum | 444/744 R |
| 4,579,016 | 4/1986 | Soroka et al. | 74/461 |
| 4,586,335 | 5/1986 | Hosoda et al. | 60/528 |
| 4,621,965 | 11/1986 | Wilcock | 901/14 |
| 4,664,232 | 5/1987 | Takagi et al. | 901/15 |
| 4,666,361 | 5/1987 | Kitabatake et al. | 414/680 |
| 4,693,666 | 9/1987 | Garin | 414/744 R |
| 4,715,773 | 12/1987 | Parker et al. | 414/730 |
| 4,783,107 | 11/1988 | Parker et al. | 294/88 |
| 4,787,813 | 11/1988 | Stevens et al. | 414/744.5 |
| 4,888,538 | 12/1989 | Dimitrov et al. | 318/675 |
| 4,893,254 | 1/1990 | Chan et al. | 364/513 |
| 4,921,293 | 5/1990 | Ruoff et al. | 294/111 |
| 4,962,676 | 10/1990 | Vainstock | 74/479 |
| 5,046,375 | 9/1991 | Salisbury, Jr. et al. | 74/89.22 |
| 5,047,701 | 9/1991 | Takarada et al. | 318/568.1 |
| 5,062,673 | 11/1991 | Mimura | 901/46 |
| 5,092,646 | 3/1992 | Smallridge | 74/479 |
| 5,174,168 | 12/1992 | Takagi et al. | 74/89.21 |
| 5,189,351 | 2/1993 | Torli et al. | 318/568.19 |
| 5,207,114 | 5/1993 | Salisbury, Jr. et al. | 74/479 R |
| 5,239,246 | 8/1993 | Kim | 318/568.11 |

OTHER PUBLICATIONS

J. K. Mills, Hybrid Actuator for Robot Manipulators: Design, Control and Performance, 1990 IEEE International Conference on Robotics and Automation, pp. 1872–1878, Cincinnati.

M. T. Mason, Compliance and Force Control for Computer Controlled Manipulators, 1981 IEEE Transactions on Systems, Man and Cybernetics, SMC–11(6), pp. 418–432.

(List continued on next page.)

Primary Examiner—Paul Ip
Attorney, Agent, or Firm—Armstrong, Westerman, Hattori, McLeland & Naughton

[57] ABSTRACT

The present invention provides an apparatus for controlling the angular positioning and stiffness modulations of a joint of a robotic manipulator by use of first and second motors and a control mechanisms. The first motor, preferably a direct current motor, controls angular positioning, while the second motor, preferably a servo motor, controls stiffness modulations. The angular positioning and stiffness modulations take place simultaneously, yet independently, thereby preventing interference. The first and second motors and the control mechanism are positioned within a housing. The control mechanism includes a shaft support member and threaded and non-threaded shafts. The threaded and non-threaded shafts extend from the first and second motors through threaded and non-threaded apertures, respectively, in the shaft support member to the housing where the threaded shaft is bearing mounted and the non-threaded shaft is supported in an aperture in the endwall of the housing to connect a pulley outside of the housing which is connected to a joint and link arrangement of a robotic manipulator. The shaft support member translates back and forth within the housing dependent on its position on the threaded shaft. When the shaft support member is nearer the housing endwall, the effective length of the shaft is short, the joint is stiff, effectively making the link stiff. When the shaft support member is nearer the shaft connection end of the motors, the effective length of the shaft is longer, the effective spring is soft, effectively making the actuator and link soft.

21 Claims, 7 Drawing Sheets

OTHER PUBLICATIONS

D. E. Whitney, Histoical Perspective and State–of–the–Art in Robot Force Control, IEEE International Conference on Robotics and Automation, pp. 262–268, St. Louis.

N. Hogan, Impedance Control: An Approach to Manipulation Part I–Theory, ASME Journal of Dynamic Systems, Measurement and Control, 1985, 107, pp. 1–7.

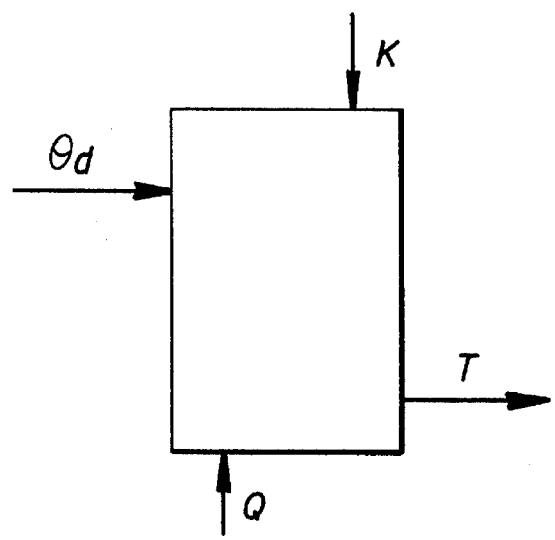
FIG. 3     PRIOR ART
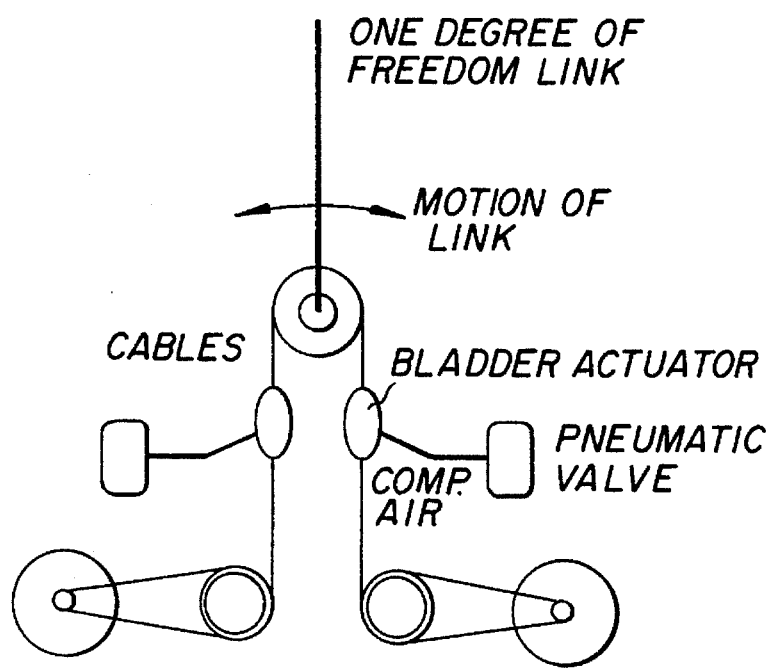
FIG. 4     (PRIOR AIR)

APPARATUS FOR CONTROLLING ANGULAR POSITIONING AND STIFFNESS MODULATIONS OF JOINT OF ROBOTIC MANIPULATOR

FIELD OF THE INVENTION

The present invention relates generally to robotic manipulators and more particularly, to a method of and apparatus for compliant motion control of robotic manipulators by performing angular positioning and stiffness modulating functions simultaneously through the use of two decoupled and independently control led motors enclosed within a housing and connected to shafts on which is mounted a slidable shaft support so that a direct current ("DC") motor controls the stiffness of the robotic manipulator's joint and a servo-motor controls the angular positioning of the robotic manipulator's joint.

BACKGROUND OF THE INVENTION

Currently, robotic manipulators are most often actuated by position control of joints that possess unmodulated stiffness. This limits most mechanical manipulators to mainly non-contact operations. On the other hand, human body by means of fingers or hands is able to manipulate objects and to master the object's dynamic response and thereby, interact well with the environment. Robotic manipulators could thus benefit from the teachings of human anatomy which suggests that both independent modulation of stiffness and position is needed in order to execute constrained maneuvers.

Referring to prior art FIG. 1(a), a typical human joint is shown. Simplistically, a typical human joint is made up of two major bones which move at some angle relative to each other by means of abductor muscles and flexor muscles. The abductor and the flexor muscles form an antagonistic actuation scheme in which the abductor and the flexor are being activated to determine two joint outputs, namely, the joint position or angle 8 and the joint stiffness K. These two outputs are being controlled via two separate inputs.

Actuator and kinematic redundancies are the means by which the human musco-skeletal system controls its dynamic response. Human muscles are activated by neural commands to maintain a desired stiffness. The activation of coantagonistic muscles modulates the stiffness of a skeletal joint, while maintaining its angular position. Decoupling the stiffness modulation from the angular positioning is an important characteristic that enables the musco-skeletal system to master grasping and manipulating objects.

Referring to prior art FIG. 1(b), a schematic is shown which relates how the interaction of the abductor and flexor muscles produces the angular $\Theta$ and stiffness K outputs. The activation input or effort to move the abductor muscle $E_{ab}$ minus the effort to move the flexor muscle $E_{fl}$ relates to the angular output $\Theta$. In other words, the difference between the activation levels of the abductor and the flexor determine the variations in the joint position.

The effort to move the abductor muscle $E_{ab}$ plus the effort to move the flexor muscle $E_{fl}$ relates to the stiffness output K. In other words, the sum of these two activations, abductor and flexor, determine the stiffness of the joint and these two control inputs are decoupled in the sense that the difference modulates the position versus the sum which modulates the stiffness.

Note that an important characteristic of a human joint is that there is no coupling between the activation inputs, i.e., $E_{ab}-E_{fl}$ and $E_{ab}+E_{fl}$, and the outputs, i.e., $\Theta$ and K, as shown by the schematic in FIG. 1(b). Like the human musco-skeletal system, robot-environment interactions can benefit by being controlled through the stiffness modulation of its joints.

Referring to FIG. 2, a schematic of a typical robot joint actuator is shown. This type of actuation scheme is often used in assembly work. Robots use basically only one input namely, position control of angles to produce an angular output $\Theta$. The stiffness output is constant as the stiffness does not vary but is instead built into the machine. Such an actuation scheme does not tend to interact very well with a changing environment and has only limited applications.

Referring to prior art FIG. 3, a schematic of a compliance control actuation scheme currently being used is shown. In this actuation scheme, an active control strategy is used. Active control is really related to closed loop control strategy in which the position $\Theta$ of the joint is measured and compared with its desired position $\Theta_d$ to calculate the error in the position. This error is translated into an applied torque T which is a function of the desired stiffness K introduced to the joint. Thus, the stiffness times the error in positioning results in an applied torque T on that joint. The closing of the loop creates reliability and stability problems that makes this actuation scheme only workable in a laboratory environment and little used in industry.

In robotic operations that expose the robotic manipulator to physical contact with the environment, small positioning errors result in large interacting forces. These large forces are due to the high stiffness that the mechanical manipulator possess. High manipulator stiffness is required for positioning accuracy. Hence, high positioning accuracy and low contact forces are conflicting requirements for conventional robotic systems. This conflict has limited the robotic applications that expose the manipulator to physical contact with its environment.

Mechanical manipulators that are position controlled have had a limited success in physical contact operations. The advantages of compliant motion control have been recognized, yet industrial compliance control manipulators do not exist. The present invention has been developed to control the angular position of a joint and independently modulate its stiffness. This actuator enables the automation of contact operations that position controlled robots fail to execute.

The importance of compliant motion control has been recognized, however, commercial compliance controlled manipulators do not exist. Most robotic manipulators emphasize position control, while overlooking compliance control schemes. Recently, however, research has contemplated compliant motion control schemes as a remedy. For instance, research has been conducted by N. Hogan to experiment with modulating end-effector compliance by utilizing actuator redundancies.

Other research by D. E. Whitney, for example, has introduced active control strategies that utilize force sensors to monitor physical interactions and determine appropriate motion commands. In this scheme, force sensors are being utilized to monitor the physical interactions and determine appropriate motion commands. What the force sensors really are monitoring is the physical interaction between the manipulator and its environment.

Referring to prior art FIG. 4, other research by J. K. Mills studied schemes of coantagonistic bladder actuators, for which the stiffness modulation and angular positioning are highly coupled. This undesired coupling may be eliminated only through complex control algorithms.

It is an object of the present invention to develop a new non-antagonistic actuation scheme, that decouples the stiffness modulation from its angular positioning to drive a manipulator, while at the same time modulating the manipulator's end-point stiffness.

It is a further object of the present invention to develop an angular positioning and stiffness modulating actuator of a small enough size and weight to be placed at a joint in order to be commercially useful.

It is a further object of the present invention to develop an angular positioning and stiffness modulating actuator which accomplishes both position control and stiffness control in open loop to make the actuation scheme more stable and reliable and less expensive than existing compliant control schemes.

It is a further object of the present invention to develop an angular positioning and stiffness modulating actuator which simplifies present compliance control schemes in that no sensing and feedback functions are necessary.

SUMMARY OF THE INVENTION

The present invention provides an angular positioning and stiffness modulating actuator and method for robotic manipulators which uses a direct current ("DC") motor and a servo motor that are decoupled from each other and that are enclosed within a housing to act simultaneously to perform position control and stiffness control functions.

The direct current ("DC") motor is positioned within the housing so that one end wall of the motor rests against one end wall of the housing and the other end wall of the motor is connected to a self locking, threaded shaft which is bearing mounted to an opposing end of the housing. The servo motor is positioned within the housing directly beside the direct current motor and so that one end wall of the motor rests against one end wall of the housing and the other end wall of the motor is connected to a shaft which extends through an aperture in an opposing end wall of the housing. A slidable shaft support is positioned by the direct current ("DC") motor to determine the effective length $l_{eff}$ of the servo motor shaft which in turn determines the changing value of the output or joint stiffness of the actuator.

The shaft is then connected to a pulley which is in turn connected to a Joint and link arrangement via tendons or a belt. When a deflecting torque is applied against the link, the shaft is able to move back and forth in the aperture in the housing because the aperture is large enough to accommodate some translation of the shaft to compensate for the deflecting of the link. The torques do not cause the pulley to turn and thus, guarantee the decoupling of the angular positioning and stiffness modulating functions.

BRIEF DESCRIPTION OF THE DRAWING FIGURES

FIG. 3 is prior art showing a schematic of existing compliance control actuation schemes.

FIG. 4 is prior art showing a coantagonistic actuation scheme using bladder actuators.

Figures 13A, 13B, 13C:
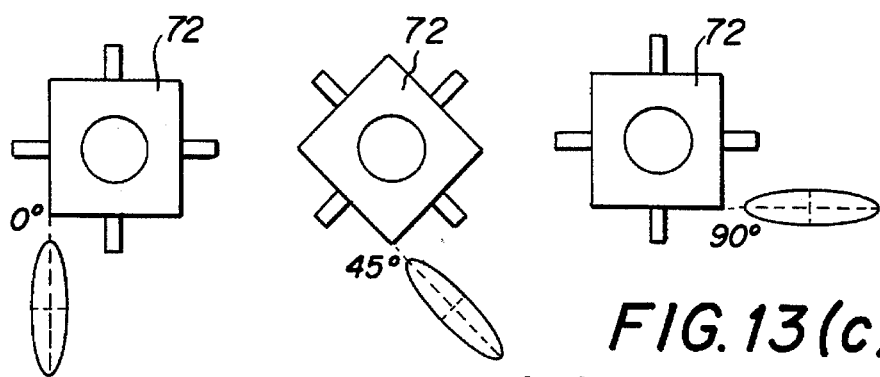

FIG. 13(a), (b) and (c) is a schematic showing the effect of changing nut configurations on the orientation of the desired stiffness ellipsoid.

DETAILED DESCRIPTION OF THE PREFERRED EMBODIMENT

Figure 1A:
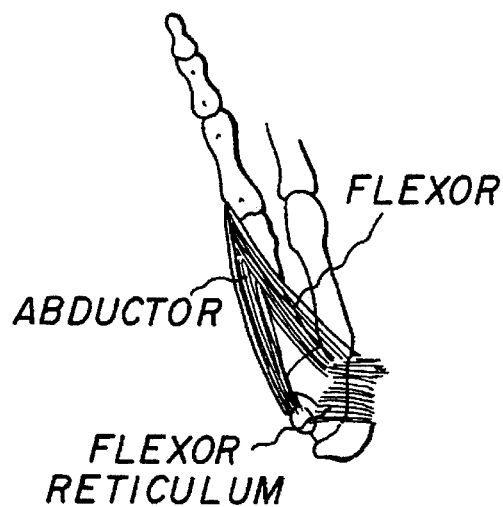
FIG. 1(a) is prior art showing a front view of a typical joint in the human musco-skeletal system.
Figure 1B:
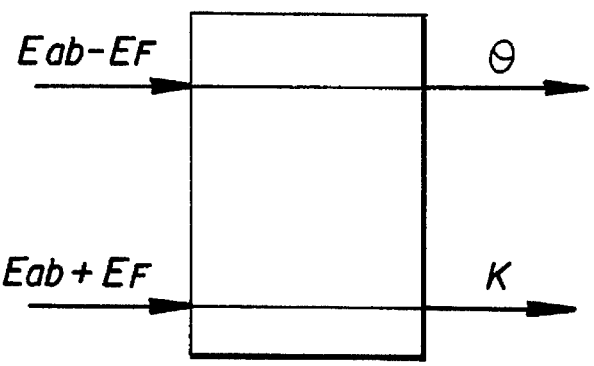
FIG. 1(b) is prior art showing a schematic of the antagonistic actuation scheme of a joint in the human musco-skeletal system.
Figure 2:
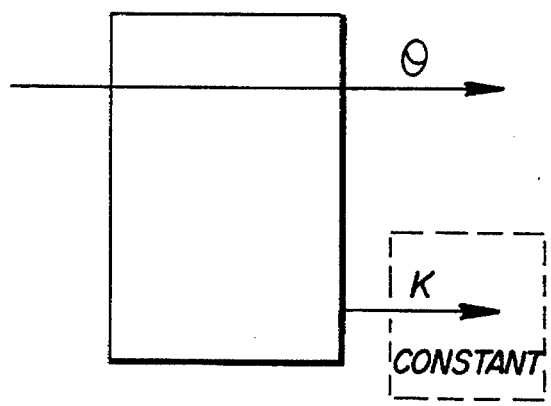
FIG. 2 is prior art showing a schematic of a typical robotic actuation scheme in use in industry today.
Figure 5:
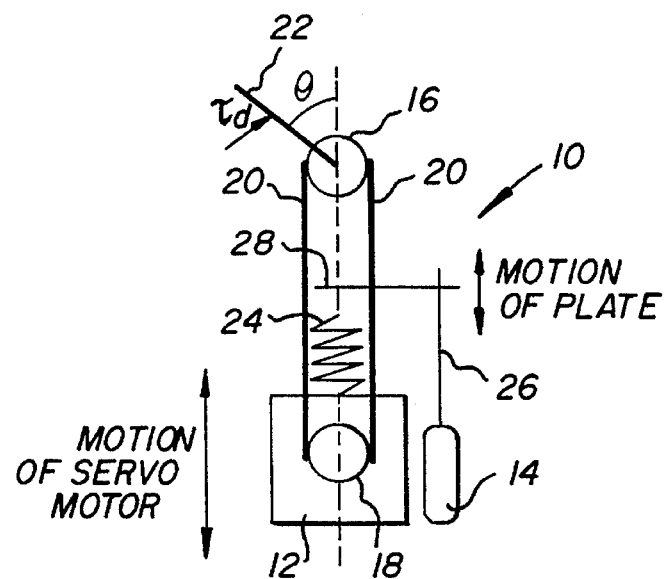
FIG. 5 is a schematic of the angular positioning and stiffness modulating actuator of the present invention.

The drawing figures illustrate the principles of the angular positioning and stiffness modulating actuator 10 of the present invention. Referring to FIG. 5, a schematic of the angular positioning and stiffness modulating actuator 10 is shown. A servo motor 12 is shown beside a direct current ("DC") motor 14. The servo motor 12 is connected to a joint 16 via a pulley 18 and tendon 20 arrangement.

The joint 16 is also connected to a link 22 which is positioned at an angle $\Theta$ from the central axis of the servo motor 12. The link 22 may be angularly deflected due to a disturbing torque $T_d$ placed against the link 22. The servo motor modulates the angular positioning $\Theta$ of the link 22 through the tendons 20.

FIG. 5 schematically shows the servo motor 12 being mounted against a non-linear spring 24 although any arrangement capable of effectively imitating a spring may be used. The non-linear spring 18 has a variable compression which is determined by the position of the direct current ("DC") motor 14. The direct current ("DC") motor is attached to a leadscrew 26 and plate 28 arrangement, although other arrangement than a leadscrew and plate may be used without departing from the spirit and scope of the present invention.

The direct current ("DC") motor 14 modulates the stiffness of the joint 16 by virtue of its positioning, i.e., either close to the plate 28 or far away from the plate 28. When the direct current ("DC") motor is positioned at a great distance from the plate 28, the spring 24 is soft and the stiffness in the joint 16 is soft. When the direct current ("DC") motor is positioned at a small distance from the plate 28, the spring 24 is stiff and the joint 16 is also stiff.

Figure 6:
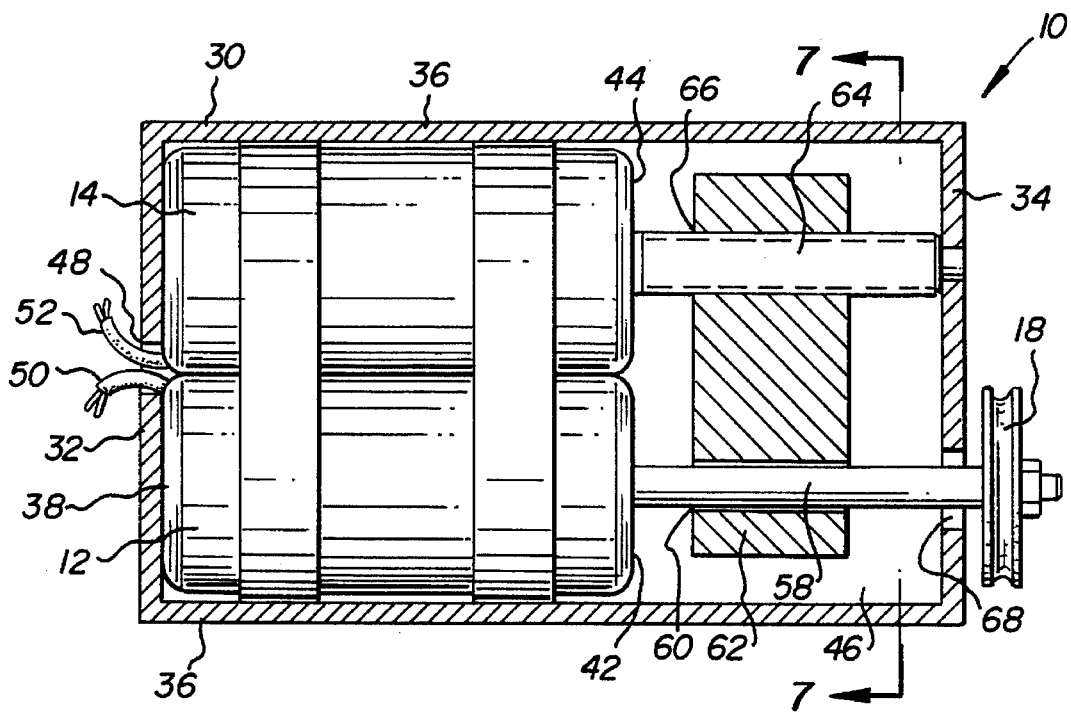
FIG. 6 is a cutaway front view of the angular positioning and stiffness modulating actuator of the present invention.
Figure 7:
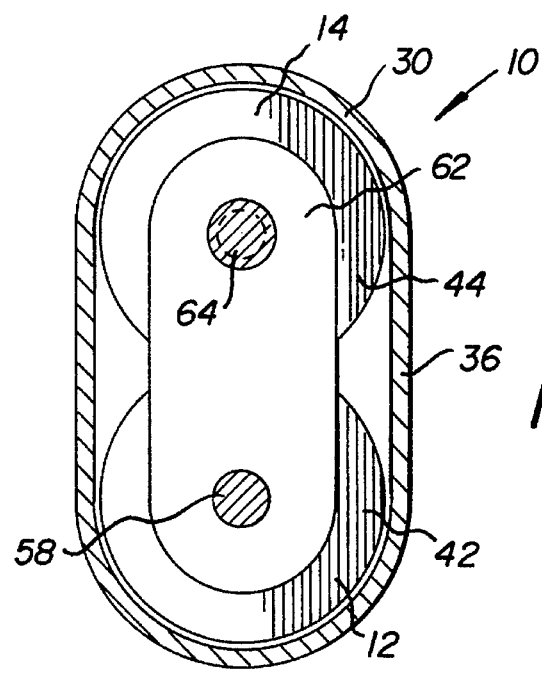
FIG. 7 is a cross-sectional view through line 7—7 of FIG. 6.

Referring to FIGS. 6 and 7, the preferred embodiment of the angular positioning and stiffness modulating actuator 10 of the present invention is shown. FIG. 6 shows a housing 30 having two ends walls 32, 34 and a cylindrical side wall 36. The servo motor 12 and the direct current ("DC") motor 14 are positioned side by side within the housing 30 so that the electrical connection end 38, 40 of each of the motors 12, 14, respectively rests against end wall 32 of the housing 30. Each motor 12, 14 also has a shaft connection end 42, 44, respectively. With the electrical connection end 38, 40 resting against end wall 32 of the housing 30, a chamber 46 is created adjacent the end 34 of the housing 30.

The end wall 32 of the housing 30 against which the electrical connection ends 38, 40 of the motors 12, 14 are positioned has an aperture 48. The aperture 48 through housing 30 allows electrical wires or leads 50, 52 to extend from the electrical connection ends 38, 40 of the motors 12, 14 for ultimate connection to power supplies 54, 56.

The wire or lead 50 extending from the servo motor 12 through the aperture 48 in the end wall 32 of the housing 30 is preferably electrically connected to a function generator 54 which supplies pulses of energy with changing pulse widths to the apparatus it powers. The change of the pulse width in this type of generator 54 is controlled from −70° to +70°. In other words, every pulse width gives an angle so that this type of generator 54 is desirable for use with the servo motor in controlling angular positioning.

The wire or lead 52 which extends from the direct current ("DC") motor 14 through the aperture 48 in the end 34 of the housing 30 is preferably electrically connected to a typical electrical outlet 56 via a plug arrangement supplying approximately between 0 to 12 volts of direct current power.

The shaft connection end 42 of the servo motor 12 is connected to an effective spring-shaft 58. The effective spring-shaft 58 is received in a cylindrical aperture 60 through a shaft support 62. The shaft support 62 is capable of translating back and forth on the effective spring-shaft 58 within the chamber 46 in the side of the housing opposite the motors 12, 14. The shaft 58 functions effectively like a spring in a manner similar to the non-linear spring 24 of FIG. 5.

The spring effect of the effective spring-shaft 58 is accomplished by means of a threaded shaft 64 which mates with a threaded cylindrical aperture 66 through the shaft support 62. The threaded shaft 64 is self locking and acts to control the positioning of the shaft support 62 within the chamber 46. In this manner, when the slidable shaft support 62 is positioned away from the shaft connection ends 42, 44 of the motors 12, 14 and closer towards the end 34 of the housing 30, the effective length $l_{eff}$ of the shaft 58 is short making the joint 16 stiff and effectively making the link 22 stiff. When the shaft support 62 is positioned towards the shaft connection ends 42, 44 of the motors 12, 14 and away from the end 34 of the housing 30, the effective length $l_{eff}$ of the shaft 58 is longer which makes the effective spring soft, effectively making the actuator 10 soft and the link 14 soft.

The shaft 58 extends through the shaft support 62 and through an opening 68 in the housing 30. The end of the shaft 58 which extends outside of the housing 30 is connected to a pulley 18 located outside of the housing 30. The pulley 18 is connected to the joint 11 via tendons 20 or a belt.

The opening 68 in the end 34 of the housing 26 is of a size to meet two requirements. First, the opening 68 is larger than the diameter of the shaft 58 in order to accommodate the extension of the shaft 34 through the opening 68 in the end 34 of the housing 30. Second, the opening is large enough to allow the shaft 58 to move back and forth within the opening 68 to accommodate deflection of the link 22 due to the application of a deflecting torque $T_d$ on the link 22.

FIG. 7 shows a cross-section through the housing 30, shaft support 62, threaded shaft 64 and effective spring-shaft 58 of the actuator 10. The shaft support 62 is shown as oval in cross-section but may be of any shape capable of translating on the effective spring-shaft 58. The shaft support 62 is also shown as having a periphery that is somewhat smaller than the inside periphery of the housing 30 in order for the shaft support to translate easily back and forth on the effective spring-shaft 58 without interference from the housing 30.

Figure 8:
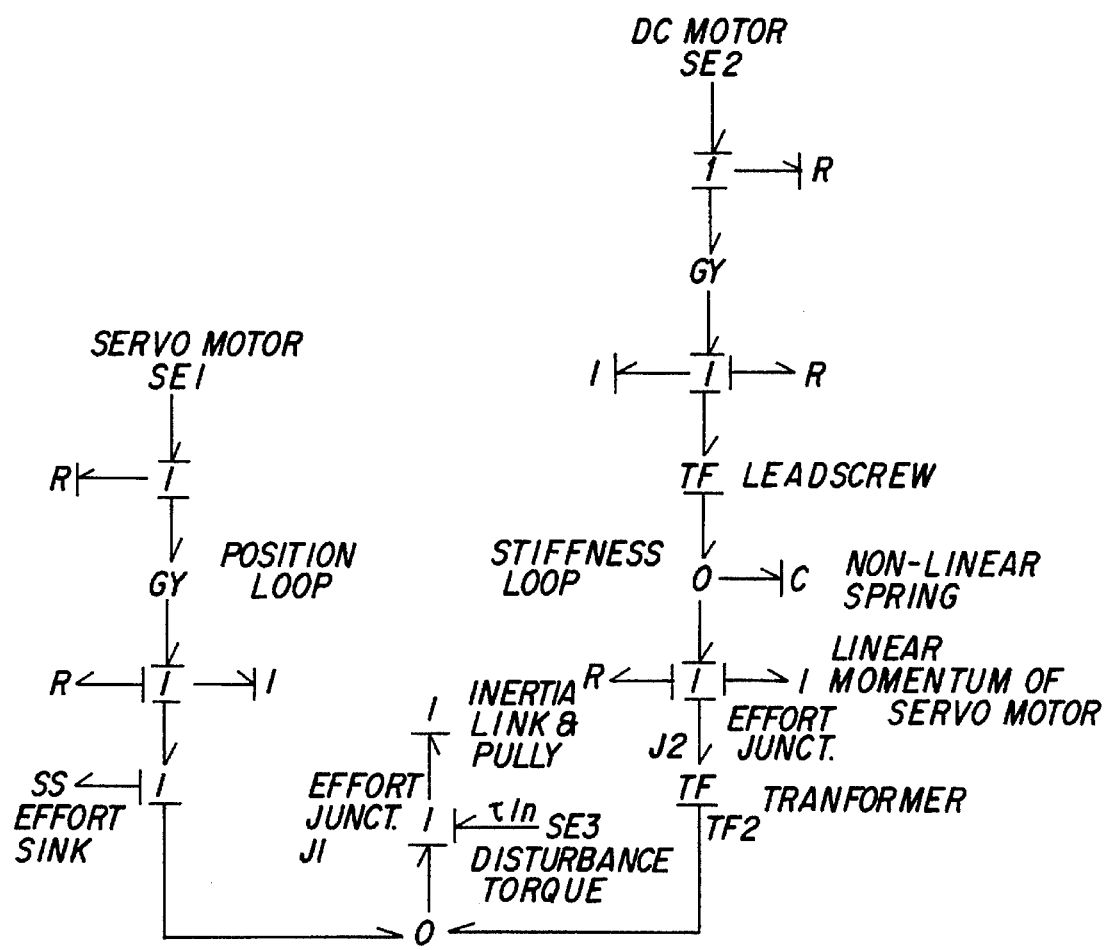
FIG. 8 is a bond graph model of the stiffness modulating actuator.

Referring to FIG. 8, a bond graph model of the actuator 10 is shown. The bond graph model depicts the holding torque of the servo motor as an effort sink ("SS"). The link 14 is represented by the inertia I and is being controlled through two separate loops, namely, the position loop and the stiffness loop. The bond graph model shows that the position of the link can be modulated without modifying the stiffness of the joint. Conversely, the stiffness of the joint can be modulated without changing the position of the link. This is guaranteed as long as the disturbing torque $T_{in}$ applied on the link will be less than the holding torque of the servo motor which is depicted by the effort sink SS. This really determines the design range of operation of the actuator 10. In other words, when the disturbing torque $T_{in}$ is less than the holding torque, the dissipated energies in the stiffness and positioning loops are decoupled. This constitutes the desired work space of the actuator 10.

Figure 9:
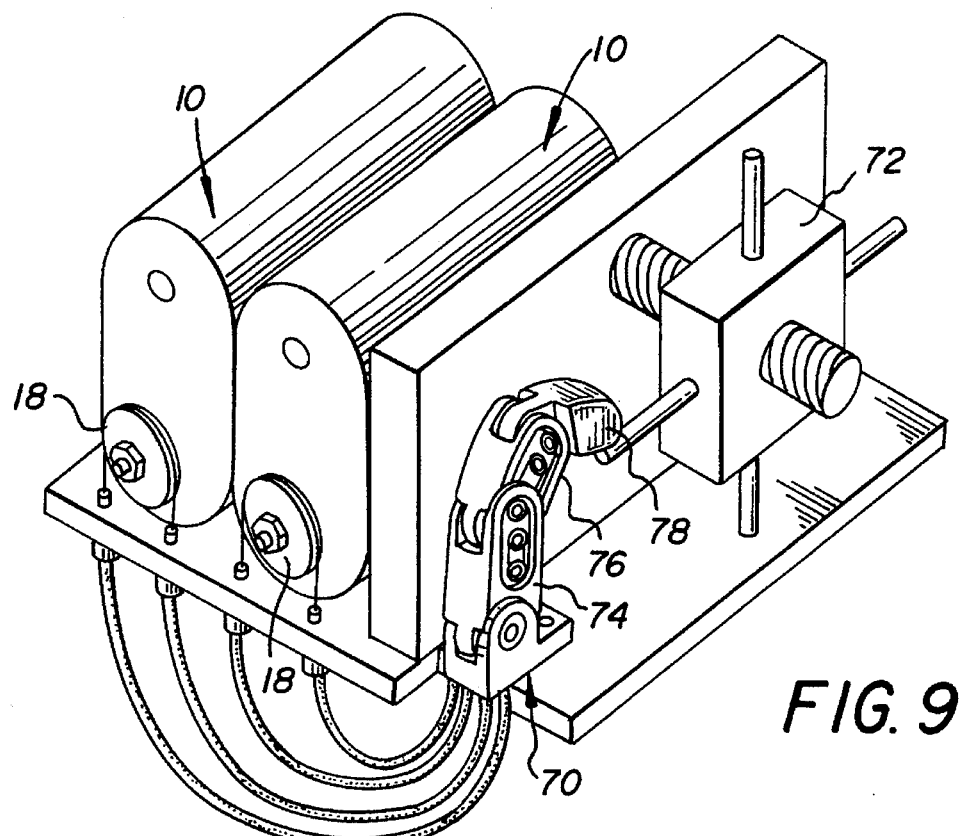
FIG. 9 is a schematic of a two degree of freedom robotic manipulator driven by two stiffness modulating actuators.

Referring to FIG. 9, an apparatus that utilizes two angular positioning and stiffness modulating actuators 10 of the present invention is shown. A prototype of this nature was assembled and the actuators 10 were used to drive a robotic manipulator such as an anthropoid finger 70 used to turn a nut 72.

The anthropoid finger 70 shown in FIG. 9 has three degrees of freedom. In other words, it is like a typically human finger in that each finger has three sections, namely, a base section 74, a middle section 76 and a distal section 78 all hinged together. In the anthropoid finger 70 shown in FIG. 9, however, the middle and the distal joints are kinematically coupled to simulate the natural motion control of the human finger. Through experimentation using the prototype, it was found that the finger had the capacity to be positioned in its work-space while modulating its end-point stiffness.

Figure 10:
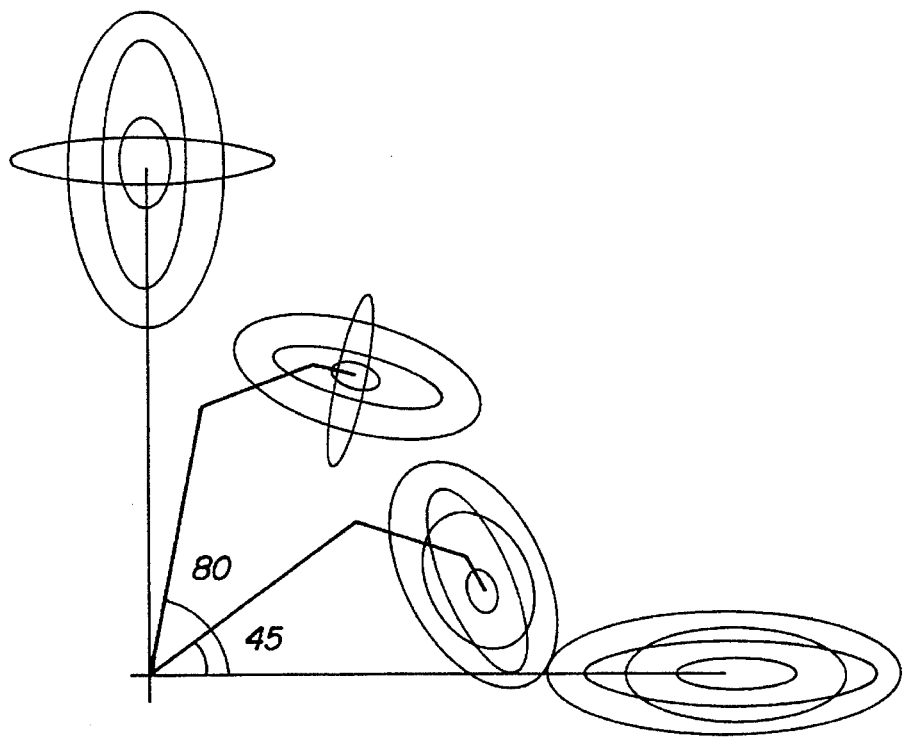
FIG. 10 is a graph showing four extreme combinations of end point stiffness ellipsoids generated by modulating the joint stiffness values of the robotic manipulator.

Referring to FIG. 10, four extreme combinations of end point stiffness ellipsoids generated for four finger positions are depicted. The four ellipsoids are obtained when the two joint stiffness values are set to soft/soft, soft/stiff, stiff/soft and stiff/stiff. The stiffness or softness may be measured in pounds per inch (lb/in). For a given finger position, the apparatus modulates the ellipsoids' size, without altering the ellipsoids' orientations. For instance, modulating the individual joint stiffness varies the eigenvalues of the stiffness matrix, without altering the eigenvectors.

Figure 11:
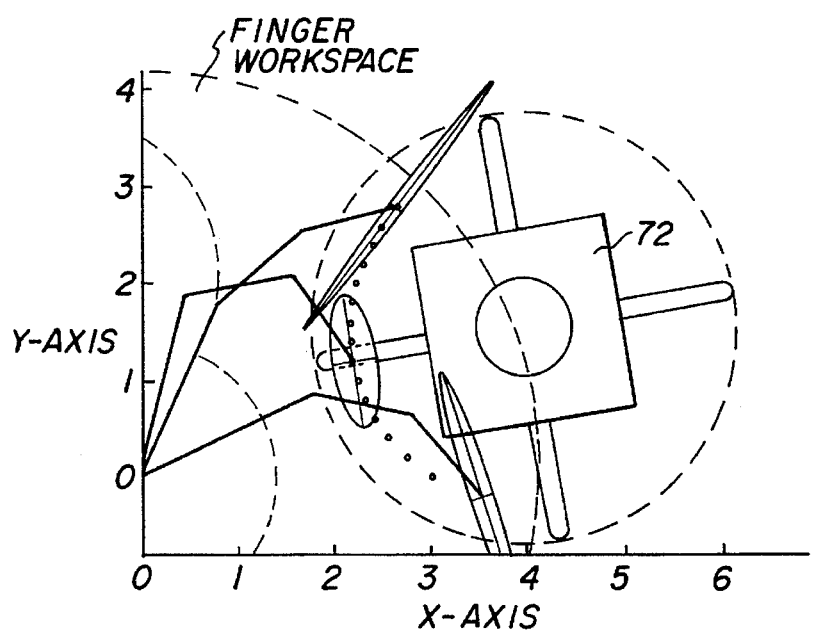
FIG. 11 is a graph showing stiffness ellipsoids at the end-point when the robotic manipulator finger follows a circular trajectory.
Figure 12:
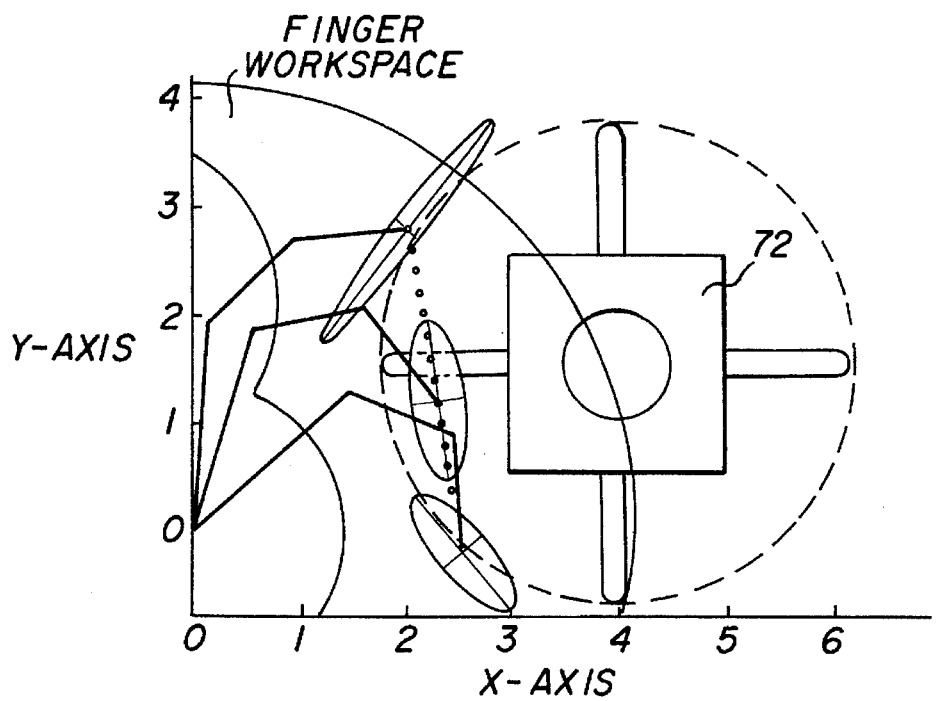
FIG. 12 is a graph showing stiffness ellipsoids at the end point when the robotic manipulator finger follows a straight line trajectory.

Referring to FIGS. 11 and 12, the stiffness modulated finger is shown as having been programmed to execute a nut fastening operation. Nut fastening is an example of a common assembly-line operation, the automation of which requires positioning commands and stiffness modulation. When the finger end-point follows a circular trajectory as shown in FIG. 11, wide range of stiffness values will result in a successful nut fastening operation. Yet, in a straight line trajectory as shown in FIG. 12, or in a finger-nut mating, the end-point stiffness determines the task's success.

In FIGS. 11 and 12, the joints' stiffness values are constants, yet the variations of the finger positionings alter the end-point compliance significantly. This illustrates that, in part mating operations, stiffness analysis is crucial for understanding the undergoing mechanisms that determine the magnitudes of the contact forces, and eventually the success of the task.

Referring to FIGS. 13(a), (b) and (c), a schematic representation of the effect of the changing nut configuration on the orientation of the desired stiffness ellipsoid is shown. The task conditions such as friction level and generated force magnitudes determine the size of the ellipsoid, whereas the nut's positioning dictates the ellipsoids' desired orientation. If the task conditions are invariant, the shape and size of the ellipsoid remains unchanged but not the orientation.

In operation, the angular positioning and stiffness modulating actuator 10 of the present invention works as follows. The first consideration in using the actuator 10 is to consider the task that is to be executed and in executing that task what constraints are going to be imposed on the manipulator. The constraints to be imposed on the manipulator are going to be translated into orientations and sizes of the compliance at the contact point.

In use, the actuator 10 must be positioned so that the manipulator is at the desired location and the compliance ellipsoid must be modified accordingly. While the task is being performed, the compliance ellipsoid is going to be continually adjusted in order for the task to be executed successfully. The continual adjustment taking place is through the modulating of the stiffnesses of the individual joints of the manipulator.

The angular positioning and stiffness modulating actuator 10 of the present invention has the capacity to simulate currently commercially available manipulators and to introduce position control with high stiffness joints. In this mode, the shaft support would be positioned away from the motors 12, 14 and towards the end wall of the housing 30. The effective length $l_{eff}$ of the shaft of the servo motor will be short representing high stiffness in the joint 14.

This constitutes simple position control of high stiffness joints, i.e., the type of compliance control used by most commercially available manipulators today. In other words, the position of this joint is controlled in order to control the position of the manipulator. In this mode, the manipulators are good for performing pick-and-place and non-contact operations.

The angular positioning and stiffness modulating actuator 10 of the present invention is also capable of performing contact operations or part mating operations. Contact or part mating operations are typically done in assembly line work or when working in a non-deterministic environment where the part positions are not well known or not known with great accuracy. In such case, it is necessary either to make the position control function of the actuator 10 more and more accurate by use of higher and higher quality motors which has its own limitation, or to simulate what the human body can do in accommodating the inaccuracies in the position by introducing softer and softer compliant control joints.

Thus, the angular positioning and stiffness modulating actuators 10 of the present invention are capable of performing compliant motion control functions in a simple, open loop manner. In this way, the shaft support will be positioned away from the end wall of the housing and towards the shaft connection ends of the motors in order to position the shaft support in a desired location to introduce enough stiffness to do the work, yet not be excessively stiff so as to break the environment. Thus, the servo motor works simultaneously with the direct current motor to respectively control the position of the shaft support and to place the shaft support in the correct position in order to achieve the appropriate length of the shaft to introduce the stiffness required to do the work or to successfully complete the task. More complex operations like assembly operations may require on-line adjustments of the position of the shaft support while the servo motor is performing position control.

The present invention has been shown in the drawing figures and described in detail in its preferred embodiment for the purposes of illustration, however, variations and departures can be made therefrom by one of ordinary skill in the art without departing from the spirit and scope of the invention.

We claim:

1. An apparatus for controlling the angular positioning and stiffness modulation of a joint of a robotic manipulator comprising:

a housing;

means positioned within said housing for controlling said stiffness modulations of said joint of said robotic manipulator;

means positioned within said housing for controlling said angular positioning of said joint of said robotic manipulator;

a threaded shaft connected to said means for controlling said stiffness modulations;

a shaft connected to said means for controlling said angular positioning; and a shaft support means having an aperture and a threaded aperture therethrough for receiving said shaft and said threaded shaft, respectively, in order for said shaft support means to translate back and forth on said shaft due to the positioning of said shaft support means on said threaded shaft.

2. The apparatus as in claim 1 wherein said means for controlling said stiffness modulations is a direct current motor.

3. The apparatus as in claim 2 wherein said means for controlling said angular positioning is a servo motor.

4. The apparatus as in claim 3 wherein said threaded shaft extends from said means for controlling stiffness modulations to a bearing mounted position on an endwall of said housing and said shaft extends from said means for controlling angular positioning through an opening in said endwall of said housing.

5. The actuator as in claim 4 wherein said threaded shaft is self locking in order for said shaft support means to be locked into position on said threaded shaft.

6. The actuator as in claim 5 wherein said direct current motor and said servo motor each have a first end and a second end wherein said motors are positioned within said housing directly beside each other so that said first ends of each of said motors is placed directly against a first end of said housing to thus create a chamber between said second ends of said motors and a second end of said housing.

7. The actuator as in claim 6 wherein said threaded shaft extending from said direct current motor to said second end wall of said housing and said shaft extending from said servo motor through said aperture in said housing each are contained in said chamber of said housing.

8. The actuator as in claim 7 wherein said pulley is connected to a joint and link arrangement such that when a deflecting torque is placed on said link, said shaft attached to said pulley is capable of back and forth movement within said aperture in said housing.

9. The actuator as in claim 8 wherein said first ends of each of said direct current and servo motors have wires extending therefrom, said wires extending through an aperture on said first end wall of said housing for connection to a power source.

10. The actuator as in claim 9 wherein said wire extending from said direct current motor is for electrical connection to an outlet supplying an approximate 0 to 12 volts of direct current energy.

11. The actuator as in claim 10 wherein said wire extending from said servo motor is for electrical connection to a generator which supplies energy in pulses.

12. A method of actuating a robotic manipulator comprising the method steps of:

providing a robotic manipulator with an angular positioning and stiffness modulating actuator having two motors means disposed within a housing, wherein one of said two motor means is a direct current motor means for controlling stiffness of a joint of said robotic manipulator and the other of said two motor means is a servo motor means for controlling angular positioning of said joint of said robotic manipulator;

angularly positioning said joint of said robotic manipulator;

modulating said stiffness of said joint of said robotic manipulator simultaneously with said angular positioning step; and positioning a shaft support means on a self locking threaded shaft in order to control said angular position of said joint.

13. The method as in claim 12 wherein the method step of positioning said shaft support means further comprises positioning of said support shaft means so that said shaft has a short effective length in order to be stiff.

14. The method as in claim 13 wherein the method step of positioning said shaft support means further comprises positioning of said support shaft means so that said shaft has a long effective length in order to be soft.

15. An apparatus for controlling the angular positioning and stiffness modulations of a joint of a robotic manipulator comprising:

a housing;

means positioned within said housing for controlling the stiffness of said joint of said robotic manipulator;

means positioned within said housing for controlling angular positioning of said joint of said robotic manipulator; and a control means positioned within said housing for simultaneously, yet independently controlling angular positioning and stiffness modulations of said joint of said robotic manipulator.

16. The apparatus as in claim 15 wherein said control means comprises:

a shaft support means;

a shaft; and a threaded shaft.

17. The apparatus as in claim 16 wherein said means for controlling stiffness modulations is a direct current motor.

18. The apparatus as in claim 17 wherein said means for controlling angular positioning is a servo motor.

19. The apparatus as in claim 18 wherein said means for controlling stiffness modulations is positioned within said housing so that a first end of said servo motor is adjacent a first end wall of said housing and a second end of said first motor means is a distance away from a second end wall of said housing.

20. The apparatus as in claim 19 wherein said means for controlling angular positioning is positioned within said housing adjacent said servo motor so that a first end of said direct current motor is adjacent a first end wall of said housing and a second end of said first motor means is a distance away from a second end wall of said housing.

21. The apparatus as in claim 20 wherein said threaded shaft extends from said second end of said direct current motor to a bearing mounted position on said second endwall of said housing and said shaft extends from said second end of said servo motor through an opening in said second endwall of said housing.

* * * * *